United States Patent [19]

Ueno

[11] Patent Number: 5,263,131
[45] Date of Patent: Nov. 16, 1993

[54] DATA PROCESSING APPARATUS FOR OUTPUTTING RULED LINES ON SUCCESSIVE PAGES

[75] Inventor: Hideo Ueno, Nagoya, Japan

[73] Assignee: Brother Kogyo Kabushiki Kaisha, Nagoya, Japan

[21] Appl. No.: 564,853

[22] Filed: Aug. 9, 1990

[30] Foreign Application Priority Data

Oct. 20, 1989 [JP] Japan .................................. 1-274668

[51] Int. Cl.$^5$ ............................................. G06F 15/62
[52] U.S. Cl. .................................... 395/143; 395/145; 395/148
[58] Field of Search ............................... 395/140–143, 395/144–149, 110, 112, 111

[56] References Cited

U.S. PATENT DOCUMENTS

| | | | |
|---|---|---|---|
| 4,627,748 | 12/1986 | Mizuno et al. ................... | 395/112 X |
| 5,002,408 | 3/1991 | Hamada et al. ................. | 395/148 X |
| 5,052,835 | 10/1991 | Takahashi ....................... | 395/148 X |

FOREIGN PATENT DOCUMENTS 2217886 11/1989 United Kingdom.

*Primary Examiner*—Heather R. Herndon
*Assistant Examiner*—Almis Jankus
*Attorney, Agent, or Firm*—Oliff & Berridge

[57] ABSTRACT

The data processing apparatus comprises a line counter for counting total number of output lines while outputting ruled lines, characters, and symbols and a input data memory for storing the data of characters, symbols, and ruled lines input corresponding to the output position of each page. The vertical ruled line data output to the final line of the page under outputting, the horizontal ruled line data which touches this vertical ruled line, and the vertical ruled line data output to the first line of the next page are searched based on the data of the line counter and the input data memory. And, when the horizontal ruled line data is searched in the final line of the page and the vertical ruled line data is searched in the final line of the page and the vertical ruled line data is searched in the first line of the next page, the horizontal ruled line which corresponds to the horizontal ruled line data of the final line of the page is output to the first line of the next page.

18 Claims, 9 Drawing Sheets

COLUMN

| Line \ Col | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 00 | 00 | 00 | 00 | | | | | | | | | | | | | | | | |
| 1 | 00 | 00 | | | | | | | | | | | | | | | | | | |
| 2 | 00 | 00 | | | | | | | | | | | | | | | | | | |
| 3 | 00 | 00 | | | | | | | | | | | | | | | | | | |
| 4 | 00 | 00 | | | | | | | | | | | | | | | | | | |
| 5 | 00 | 00 | 00 | 00 | 01 | 01 | 01 | 01 | 01 | 01 | 01 | 01 | 01 | 01 | 01 | 01 | | | | |
| 6 | 00 | 00 | 00 | 10 | 00 | 00 | 10 | 00 | 00 | 00 | 00 | 00 | 00 | 00 | 00 | 10 | | | | |
| 7 | | | | 10 | 00 | 00 | 10 | | | | | | | | | 00 | 10 | | | |
| 8 | | | | 10 | 00 | 00 | 10 | | | | | | | | | 00 | 10 | | | |
| 9 | | | | 10 | 00 | 00 | 10 | | | | | | | | | 00 | 10 | | | |
| 10 | | | | 10 | 00 | 00 | 10 | | | | | | | | | 00 | 10 | | | |
| 11 | | | | 10 | 00 | 00 | 10 | | | | | | | | | 00 | 10 | | | |
| 12 | | | | 10 | 00 | 00 | 10 | | | | | | | | | 00 | 10 | | | |
| 13 | | | | 10 | 00 | 00 | 10 | | | | | | | | | 00 | 10 | | | |
| 14 | | | | 10 | 00 | 00 | 10 | | | | | | | | | 00 | 10 | | | |
| 15 | | | | 10 | 00 | 00 | 10 | | | | | | | | | 00 | 10 | | | |
| 16 | | | | 10 | 00 | 00 | 10 | | | | | | | | | 00 | 10 | | | |
| 17 | | | | 10 | 00 | 00 | 10 | | | | | | | | | 00 | 10 | | | |
| 18 | | | | 10 | 00 | 00 | 10 | | | | | | | | | 00 | 10 | | | |
| 19 | | | | 10 | 00 | 00 | 10 | | | | | | | | | 00 | 10 | | | |
| 20 | 00 | 00 | 00 | 10 | 01 | 01 | 11 | 01 | 01 | 01 | 01 | 01 | 01 | 01 | 01 | 11 | 00 | 00 | 00 | 00 |

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 00 | 00 | 00 | 00 | | | | | | | | | | | | | | | | |
| 1 | 00 | 00 | | | | | | | | | | | | | | | | | | |
| 2 | 00 | 00 | | | | | | | | | | | | | | | | | | |
| 3 | 00 | 00 | | | | | | | | | | | | | | | | | | |
| 4 | 00 | 00 | | | | | | | | | | | | | | | | | | |
| 5 | 00 | 00 | 00 | 00 | 01 | 01 | 01 | 01 | 01 | 01 | 01 | 01 | 01 | 01 | 01 | 01 | | | | |
| 6 | 00 | 00 | 00 | 10 | 00 | 00 | 10 | 00 | 00 | 00 | 00 | 00 | 00 | 00 | 00 | 10 | | | | |
| 7 | | | | 10 | 00 | 00 | 10 | | | | | | | | | 00 | 10 | | | |
| 8 | | | | 10 | 00 | 00 | 10 | | | | | | | | | 00 | 10 | | | |
| 9 | | | | 10 | 00 | 00 | 10 | | | | | | | | | 00 | 10 | | | |
| 10 | | | | 10 | 00 | 00 | 10 | | | | | | | | | 00 | 10 | | | |
| 11 | | | | 10 | 00 | 00 | 10 | | | | | | | | | 00 | 10 | | | |
| 12 | | | | 10 | 00 | 00 | 10 | | | | | | | | | 00 | 10 | | | |
| 13 | | | | 10 | 00 | 00 | 10 | | | | | | | | | 00 | 10 | | | |
| 14 | | | | 10 | 00 | 00 | 10 | | | | | | | | | 00 | 10 | | | |
| 15 | | | | 10 | 00 | 00 | 10 | | | | | | | | | 00 | 10 | | | |
| 16 | | | | 10 | 00 | 00 | 10 | | | | | | | | | 00 | 10 | | | |
| 17 | | | | 10 | 00 | 00 | 10 | | | | | | | | | 00 | 10 | | | |
| 18 | | | | 10 | 00 | 00 | 10 | | | | | | | | | 00 | 10 | | | |
| 19 | | | | 10 | 00 | 00 | 10 | | | | | | | | | 00 | 10 | | | |
| 20 | 00 | 00 | 00 | 10 | 01 | 01 | 11 | 01 | 01 | 01 | 01 | 01 | 01 | 01 | 01 | 11 | 00 | 00 | 00 | 00 |

FIG.7(b)

| | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| 0 | 00 | 00 | 00 | 00 | 00 | 00 | 00 | | | | | | | | | 00 | 00 | | | |
| 1 | | | | 10 | 00 | 00 | 10 | | | | | | | | | 00 | 10 | | | |
| 2 | | | | 10 | 00 | 00 | 10 | | | | | | | | | 00 | 10 | | | |
| 3 | | | | 10 | 00 | 00 | 10 | | | | | | | | | 00 | 10 | | | |
| 4 | | | | 10 | 00 | 00 | 10 | 00 | 00 | 00 | 00 | 00 | 00 | 00 | 00 | 00 | 10 | | | |
| 5 | | | | 10 | 01 | 01 | 11 | 01 | 01 | 01 | 01 | 01 | 01 | 01 | 01 | 11 | | | | |

DATA PROCESSING APPARATUS FOR OUTPUTTING RULED LINES ON SUCCESSIVE PAGES

BACKGROUND OF THE INVENTION

1. Field of the Invention

The present invention relates to a data processing apparatus which has the output function of a vertical ruled line and a horizontal ruled line.

2. Description of Related Art

In general, word processors of Japanese and English have large-scale display and print devices. Such word processors have numerous editing functions for easily editing the input data which comprises the document. Also, in one such word processor, it is possible to set a work table mode, also. In the work table mode, the work table can be made by using the vertical ruled line and the horizontal ruled line.

Therefore, the word processor has the data memory in the controller which stores the document data of the character and the symbol and the ruled line data concerning ruled lines such as the vertical ruled line and the horizontal ruled line corresponding to each print position. The data is output by printing the document and the ruled line in the print form and displaying on the display by reading the document data and the ruled line data from this data memory. United Kingdom Patent Publication No. 2,217,886A laid open on Nov. 1, 1989 which corresponds to U.S. patent application U.S. Pat. No. 330,908 filed Mar. 31, 1989 and assigned to the same assignee as the present application, discloses reading the ruled line data from the data memory and printing this data.

In another word processor design, because the horizontal ruled line in the table is output to the bottom of each line as an underline, this horizontal ruled line is treated as a line which belongs to the above line. Therefore, in case that the table which spreads over the first page and the second page is output and divided, when the data of the horizontal ruled line is located in the final line of the first page, the horizontal ruled line is output only to the final line of the first page. The horizontal ruled line which corresponds to the horizontal ruled line which exists in the final line of the first page is not output to the top of the first line of the second page.

On the other hand, in other word processors, the horizontal ruled line is treated as a line which comprises two lines because it is output between two output lines. Therefore, when the data of the horizontal ruled line of the table is located in the final line of the first page, the horizontal ruled line is automatically output to both the final line of the first page and the top of the first line of the next page.

As mentioned above, in the case of data processing apparatus which treats a line forming the horizontal ruled line of the table as belonging with data above the line, the horizontal ruled line which corresponds to the data of the horizontal ruled line located in the final line of the first page is not output to the first line of the next page, in spite that the table extends and continues to the next page. Therefore, there is a problem that the table output to the next page is an incomplete table where the top remains open.

On the other hand, in the case of data processing apparatus which treats the horizontal ruled line as a line which belongs to both upper and lower data lines, the horizontal ruled line of the next page is output automatically to the first line of the next page, whether there is a necessity or not, whenever the data of the horizontal ruled line is located at the bottom of the table (horizontal ruled line on the bottom line of the outside frame) is located in the final line of the first page. Therefore, there is a problem that the constitution of the table is mistaken.

SUMMARY OF THE INVENTION

An object of the present invention is to provide a data processing apparatus to judge if it is necessary to output a horizontal ruled line for the first line of a next page following a preceding page when the data of the horizontal ruled line in the table is located in the final line of the preceding page, and to output the horizontal ruled line to both the final line of the preceding page and the first line of the next page only when the output of the horizontal ruled line is necessary.

The data processing apparatus of this invention comprises: an input means to input characters, symbols, ruled lines, such as vertical ruled lines and horizontal ruled lines, and various instructions; an input data memory means to memorize the data of characters, symbols, and ruled lines input from the input means corresponding to the output position of each page; an output means which outputs the ruled lines, characters, and symbols; an output area memory to memorize set output areas of each page set by the input means; a line counter which counts the total number of lines output while outputting the ruled lines, characters, and symbols; an output control means to read the data from the input data memory means based on the data of the line counter, and to control output means to output the characters, symbols, and ruled lines corresponding to those data to the predetermined line of each page; a ruled line data search means which searches for the ruled line data of the vertical ruled line output to the final line of the page being output and the ruled line data of the horizontal ruled line which touches this, and searches for the ruled line data of vertical ruled line output on the first line of the next page, based on the data of output area memory, line counter, and the input data memory means; a horizontal ruled line addition control means which instructs the output control means to output horizontal ruled line corresponding to the ruled line data of horizontal ruled line of the final line of the page upon outputting to the first line of the next page, after receiving the ruled line data searched by the ruled line data search means, when a horizontal ruled line exists in the final line of the page and a vertical ruled line exists in the first line of the next page.

In the data processing apparatus concerning this invention, the ruled line data search means searches for the ruled line data of the vertical ruled line output to the final line of the page being output, the ruled line data of the horizontal ruled line which touches this vertical ruled line, and the ruled line data of the vertical ruled line is output to the first line of the next page, based on the data of the output area memory, the line counter, and the input data memory means. The horizontal ruled line addition control means receives the ruled line data searched from the ruled line data search means, and instructs the output control means to output the horizontal ruled line which corresponds to the ruled line of the page being output to the first line of the next page, when the ruled line data of the horizontal ruled line exists in the final line of the page being output and the ruled line data of the vertical ruled line exists in the first line of the next page. Therefore, the output means outputs the horizontal ruled line to the first line of the next page.

In the data processing apparatus related to this invention, in case that the vertical ruled line and the horizontal ruled line (in the table) exist in a final line of the page under outputting, if this table spreads to the next page, the horizontal ruled line is output to the first line of the next page, because the ruled line data search means and the horizontal ruled line addition control means are installed. As a result, the constitution of the table output to the next page can be completed. Moreover, when the table does not spread to the next page, the output of an unnecessary horizontal ruled line in the first line of the next page can be prevented.

BRIEF DESCRIPTION OF THE DRAWINGS

FIG. 5(b-1) and 5(b-2) are a flowchart showing the routine of the print processing control;

DESCRIPTION OF THE PREFERRED EMBODIMENT

Hereafter, the embodiment of this invention will be described referring to the drawings. This embodiment applies this invention to the word processor which has the CRT display screen.

Figure 1:
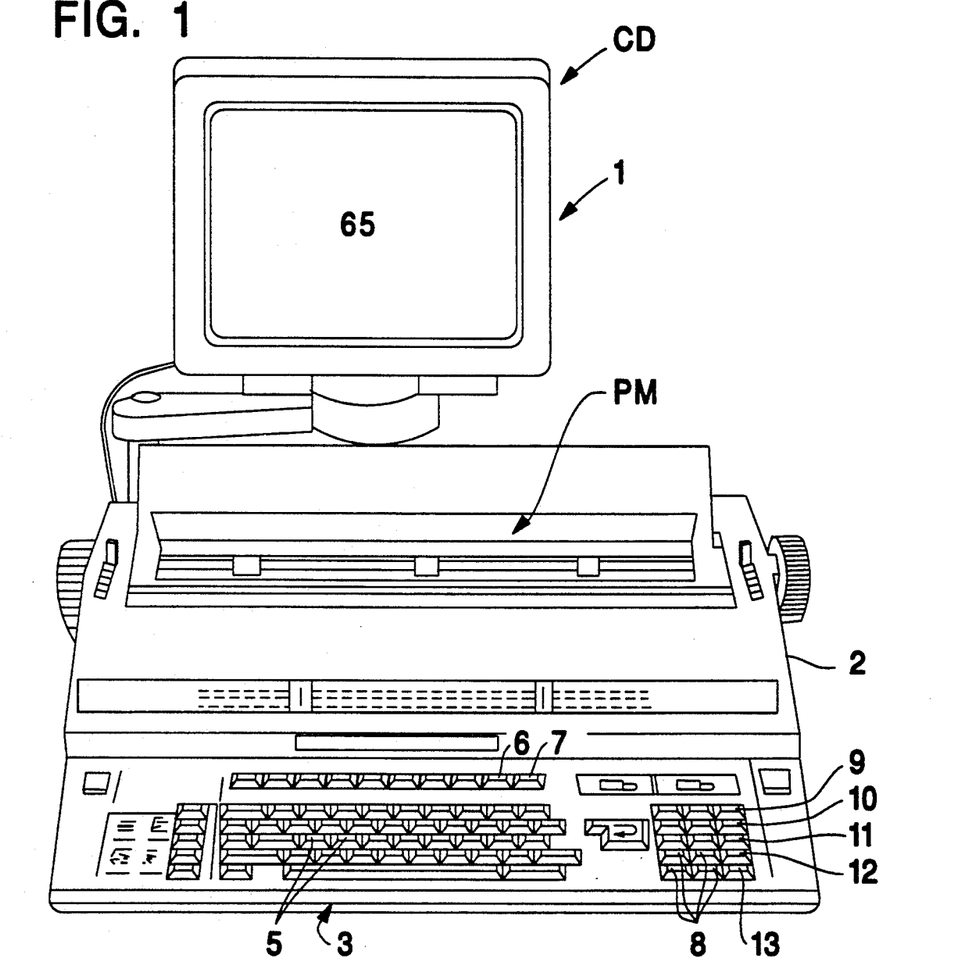
FIG. 1 is a perspective view of the word processor which applies to this invention.

As shown in FIG. 1, a keyboard 3 is provided on the front part of a main body frame 2 of a word processor 1. A print mechanism PM is installed behind the keyboard 3 and within the main body frame 2. A CRT display unit CD is provided on the rear side of the main body frame 2.

The keyboard 3 comprises various keys as follows: A plurality of character keys 5 for inputting characters, figures, and symbols; Cursor move keys 8 for moving the cursor on CRT display 65 to the upper, lower, right and left; A format set key 9 for setting various formats which are necessary to print processing and to document making processing; A document making key 10 for making a new document; A print key 11 for printing documents on paper 14; an execution key 12 for executing various processing; an end key 13 for ending various processing; Various function keys for editing and for processing the document data, etc.

The print mechanism PM comprises: the carriage and its drive mechanism; the sending mechanism for print paper 14 which consists of the platen etc. and its drive mechanism; the print head of the wire dot type and its drive mechanism.

An automatic cut sheet feeder SF (refer to FIG. 2) is connected to this word processor 1. This automatic cut sheet feeder SF comprises a stacker wherein many print papers 14 are stacked. When the changing page signal from controller C is received, this word processor 1 executes the changing page processing. In this changing paper processing, the print paper 14 to be printed is supplied from the stacker of the automatic cut sheet feeder SF to the print position.

Figure 2:
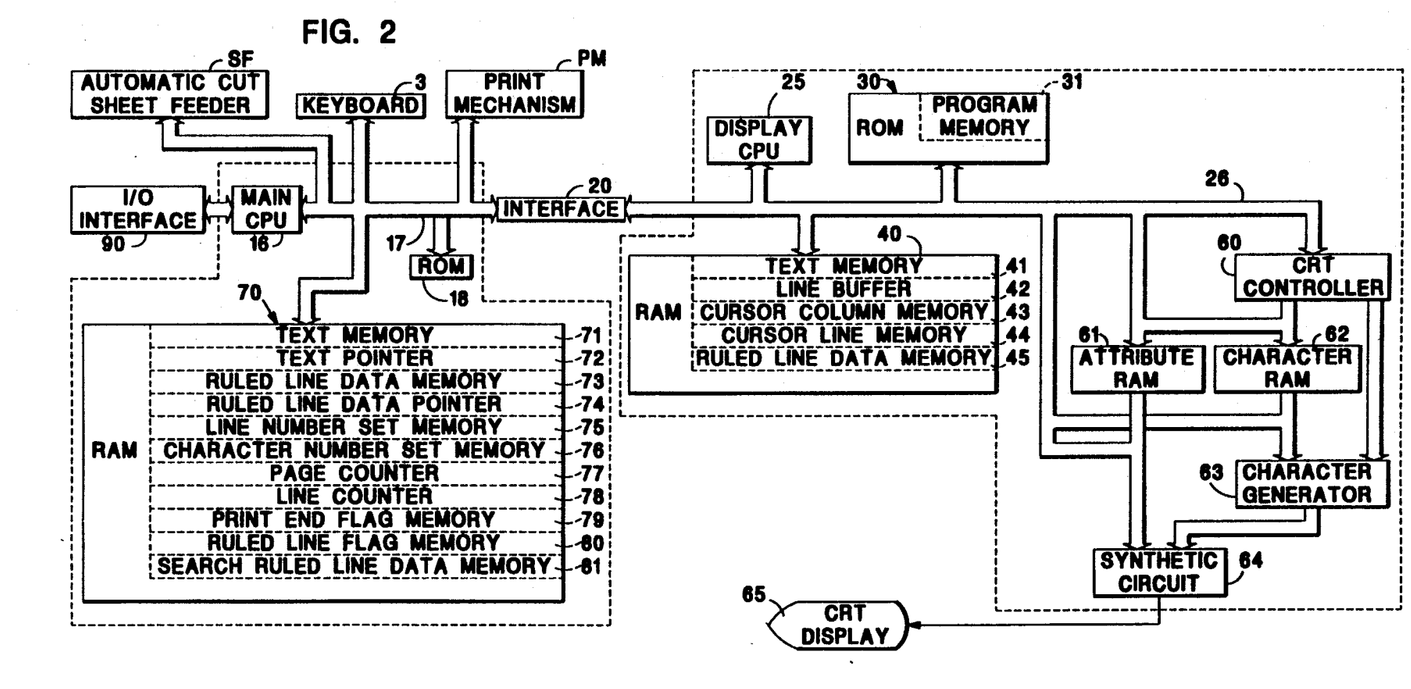
FIG. 2 is a block diagram of the control system of the word processor.

A controller C consists of main CPU 16, ROM 18 connected to main CPU 16 by bus 17 such as the data bus, and the drive circuit which drives RAM 70, the I/O interface 90, each motor of print mechanism PM, and the print head. The keyboard 3, the print mechanism PM, and the automatic cut sheet feeder SF are connected to the controller C.

Figure 6A:
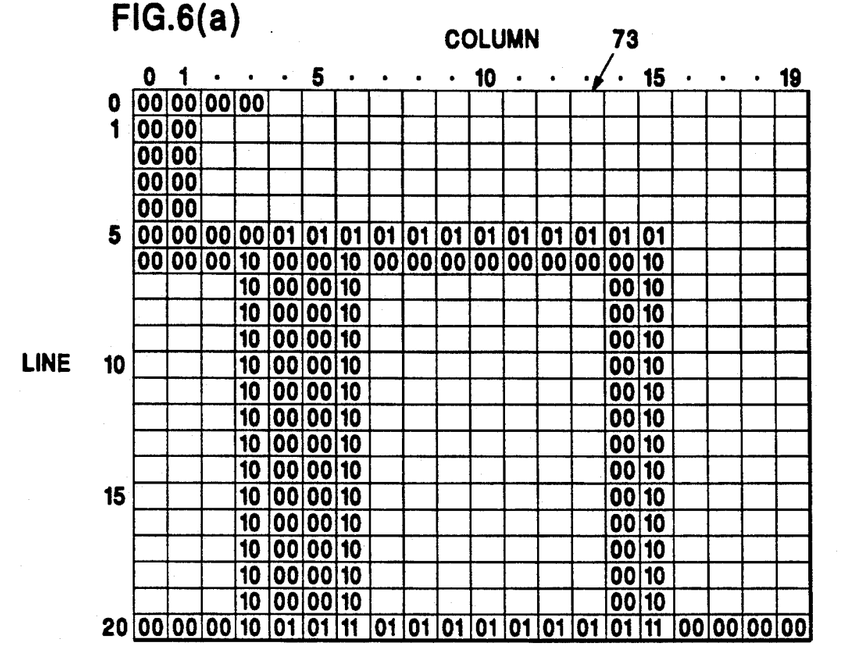
FIG. 6(a) is a diagram which explains the ruled line data memorized in the ruled line data memory when the ruled line in one page is printed.
Figure 6B:
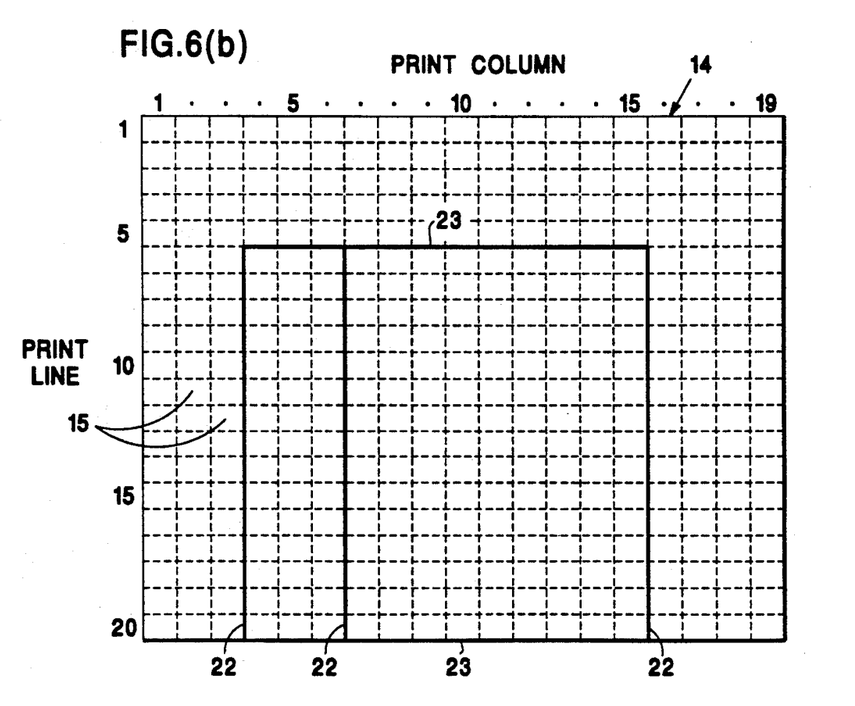
FIG. 6(b) is a diagram which explains the print result of the ruled line.

The following element is installed in RAM 70: a text memory 71 which stores a plurality of document data; a text pointer 72 (the content is called TP) which stores one address in the text memory 71; a ruled line data memory 73 which stores the ruled line data of ruled lines (for example vertical ruled line 22 and horizontal ruled line 23 of FIG. 6b) made when the document is made; a ruled line data pointer 74 which stores one address in the ruled line data memory 73 (the content is called KP); a line number set memory 75 which stores the print number of lines common to each page set by the keyboard 3 when the format is set; a character number set memory 76 which stores the number of print characters set in one print line; a page counter 77 (the content is called PC) which counts one by one the total print pages being printed; a line counter 78 (the content is called LC) which counts one by one the total print line being printed; a print end flag PF 79 set when the readout of all document data and ruled line data to be printed and to be processed ends, that is, when the readout data is END-OF-TEXT(EOT); a ruled line flag memory 80 which stores the ruled line flag KF set when the ruled line is printed; a search ruled line data memory 81 which stores the presence of vertical ruled line 22 and its position, and the presence of horizontal ruled line 23 and its beginning and ending position, when the ruled line search processes are executed; various memories which temporarily memorize the results operated and processed with the main CPU 16. In addition, the input data memory consists of the text memory 71 and the ruled line data memory 73 and each data of memory 71 and 73 is stored corresponding to the print position.

In the program memory of ROM 18, the print processing control program which controls the print mechanism PM, the program which controls the automatic cut sheet feeder SF, the program for the decipherment of the input code data, etc. are stored. In the data memory of ROM 18, about 2000 kinds of dot pattern data are memorized corresponding to each code data for printing character, symbol, and various vertical rules lines 22 and horizontal ruled lines 23.

A display unit CD is composed of a display controller DC and the CRT display 65. The display controller DC typically has display CPU 25, ROM 30 connected to display CPU 25 by bus 26 such as the data bus, RAM 40, character RAM 62, attribute RAM 61, character generator 63, synthetic circuit 64, and CRT controller 60. The ROM 30 includes a program memory 31 storing programs for controlling the display unit CD.

The RAM 40 includes the following memories: a text memory 41 for storing the document data being composed or the document data read from the text memory 71 of the RAM 70, a line buffer 42 for storing the line data of one display line indicated by the cursor in many lines displayed on the CRT display 65, a cursor column memory 43 for storing the column data of the cursor which corresponds to the cursor display position in the line buffer 42, a cursor line memory 44 for storing the data indicating the line in which the cursor is located a ruled line data memory 45 for storing the ruled line data of the ruled line made when the document is made, and various memories for memorizing temporarily the results operated on and processed by display CPU 25.

Figure 3:
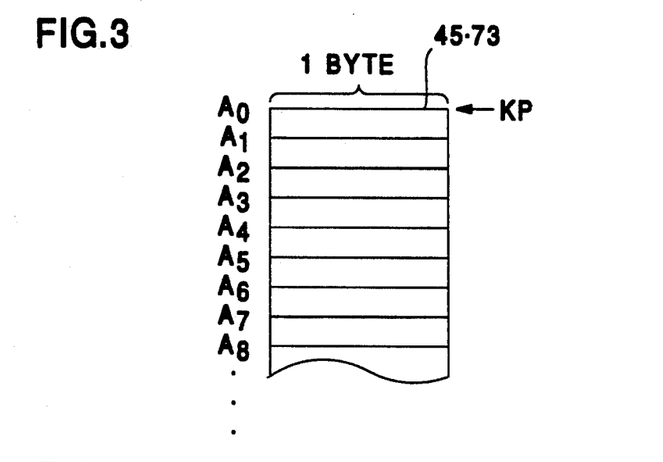
FIG. 3 and FIG. 4 are diagrams which explain the constitution of the ruled line data memory.
Figure 4:
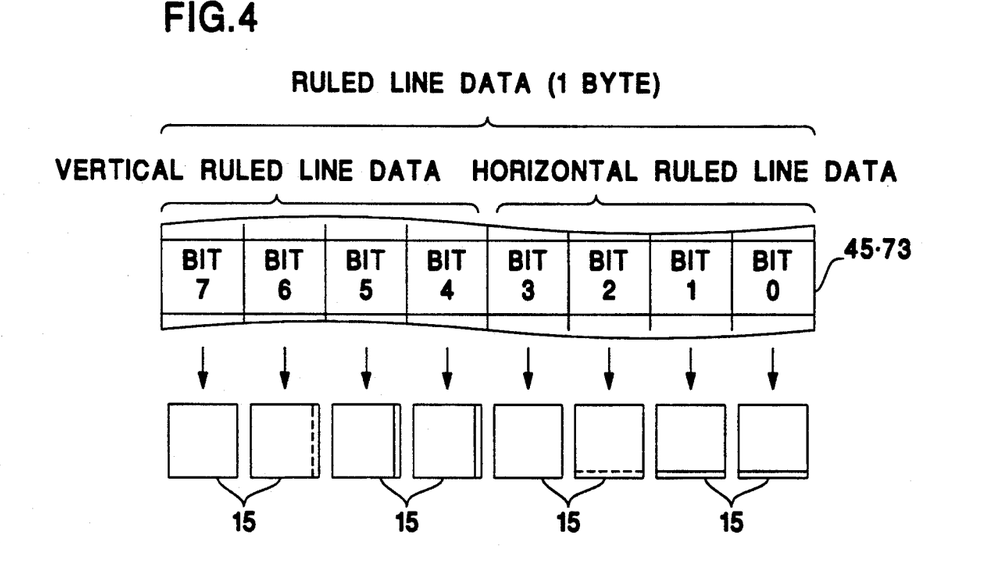

As shown, for example, in FIG. 3, in the ruled line data memory 45 and 73, the ruled line data of each ruled line which constitutes the table composed when the document data is made is stored separately at every page. The capacity of one page is set by setting the format. Each ruled line data is comprised of one byte, namely eight bits. Each address An (n=1,2,3,...) of the ruled line data memory 45 and 73 corresponds respectively to the print position of the page where the ruled line is printed. This ruled line data of one byte is the data that "1" is set in one bit among bits 0 through 7 according to the kind of the ruled line shown in FIG. 4. That is, bits 0 through 3 are for the horizontal ruled line data and bits 4 through 7 are for the vertical ruled line data. When "1" is set in bits 0 and 4 (the ruled line data "1 1"), thin horizontal ruled line "—"23 and thin vertical ruled line " "22 are printed in the bottom and the right end of the character print area 15. When "1" is set in bit 1 and 5 (the ruled line data "2 2"), heavy horizontal ruled line " "23 and heavy vertical ruled line " "22 are printed in the bottom and the right end of the character print area 15 (FIG. 6b). When "1" is set in bit 2 and 6 (the ruled line data "4 4"), the dotted line horizontal ruled line "..."23 and the dotted line vertical ruled line " "22 are printed in the bottom and the right end of the character print area 15. Besides, the function key of the keyboard 3 includes a mode key 6 which sets the ruled line mode and a ruled line key 7 which sets six kinds of ruled lines shown in FIG. 4. The ruled line data can be input by the operation of the cursor move key 8 when the ruled line mode and the kind of ruled line are set by these keys.

ROM 30 stores a cursor move control program which contains controls the data to be written in the line buffer 42 according to the operation of the cursor move key 8 of the keyboard 3 or input of the character data, a control program which controls CRT controller 60, and a control program which controls input processing of the data output from the main CPU16 or edit processing of the document data of the text memory 41.

Figure 5:
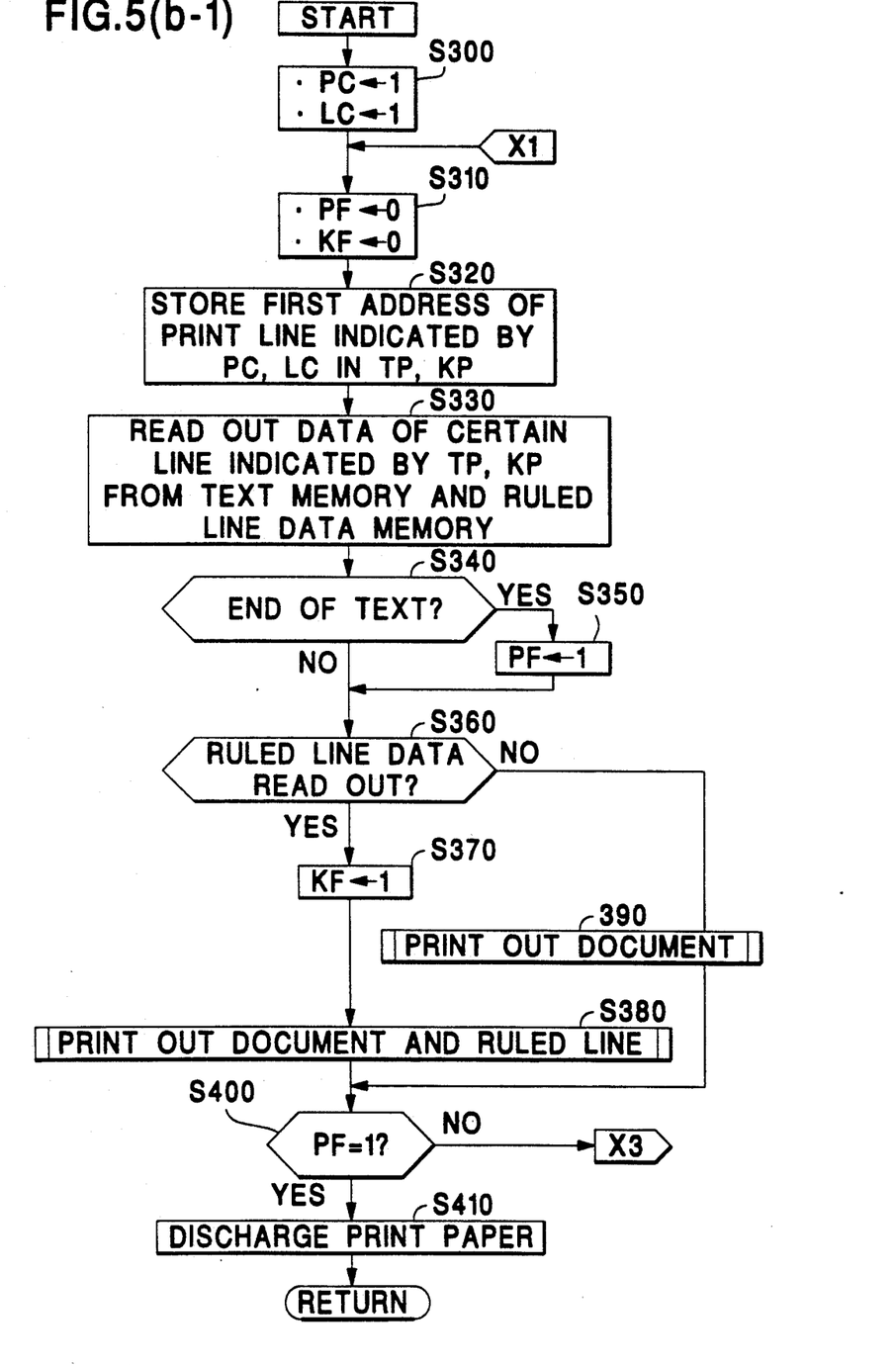
FIG. 5(a) is an outline flowchart showing the routine of a main control.

The routine of the main control executed upon turning on this word processor 1 is explained with reference to the flowchart shown in FIG. 5(a). The routine of the print processing control in the controller C of the word processor 1 is explained with reference to the flowchart in FIG. 5(b).

First, upon turning on the word processor 1, execution proceeds to a step 110 (hereinafter simply referred to as S110) where initialization is performed (S110), and a menu screen for selecting the necessary processing appears on the display 65 (S120). This menu includes "document making", "format setting", "print", and "additionally". When the block cursor is moved to the menu of the document making processing by the operation of a cursor up and down move key 8 and a execution key 12 is pressed (S130.S140), the processes go to S150 and the document making processing is begun. And, the input processing for storing the input document data in the text memory 41 through the line buffer 42, and the input processing for storing the input ruled line data in the ruled line data memory 45 corresponding to this document data are executed. Then if the end key 13 is operated, this document making processing ends (S150). In response to the operation of the end key 13, the document data in the text memory 41 is stored in the text memory 71 and the ruled line data in the ruled line data memory 45 is stored in the ruled line data memory 73 corresponding to this document data in the text memory 41. Then, the process returns to S120 and the menu is displayed again.

When the block cursor is moved to the menu of the format set processing by the operation of the cursor up and down move key 8 and the execution key 12 is pressed (S130.S160), the processes go to S170 and the format set processing is begun. And, the necessary set numbers such as print line number of one page and the print character number of one print line are input based on the displayed format set table on the display 65. Then if the end key 13 is operated, this format set processing ends (S170). In response to the operation of the end key 13, the number of print lines is stored in the set line number memory 75 and the number of the print characters is stored in the set character number memory 76. Then the process returns to S120 and the menu is displayed again.

When the block cursor is moved to the menu of print processing by the operation of the cursor up and down move key 8 and the execution key 12 is pressed (S130.S180), the processes goes to S170 and the print processing is begun. The list of the document name of each document data stored in the text memory 71 is displayed on the CRT display 65 (S190). And, when execution key 12 is operated in the condition where the block cursor moves to the necessary document name by the operation of the cursor up and down move key 8 (S200), the print processing control program of ROM 18 are read. Then, the process goes to S210 and the print processing control shown in FIG. 5(b) is begun. When this print processing control is begun, "1" is stored in page counter PC and line counter LC, after the print paper 14 is supplied to the print position from a stacker of the automatic cut sheet feeder SF (S300). The print end flag PF and ruled line flag KF are reset (S310). Next, the first address of the print line indicated by the page counter PC and the line counter LC in the selected document data of the text memory 71 is stored in the text pointer TP, and the first address of the print line indicated by the page counter PC and the line counter LC in the selected ruled line data of the ruled line data memory 73 is stored in the ruled line data pointer KP (S320). Based on the data of character number set memory 76, the document data of a certain print line of which the first address is indicated by the text pointer TP, is read out from the text memory 71, and the ruled line data of a certain print line, of which the first address is indicated by the ruled line data pointer KP, is read out from the text memory 71 (S330).

Next, when the EOT code is read, in other words, the print data, namely, the document data and the ruled line data ends at this print line (S340.YES), the print end flag PF is set (S350). And, when the ruled line data does not exist (S360.NO), the document is printed according to the document data read out at S330 (S390), then, it is determined that the end flag PF is set (S400) and the print paper 14 just printed is discharged (S410), and the processes return to the main routine.

On the other hand, when the print data is not the final print data (S340.NO) and the ruled line data exists in the present print line (S360.YES), the ruled line flag KF is set (S370). And, the document and the ruled line of one line are printed according to the document data and the ruled line data read out at S330 (S380). In this case, it is determined that the print end flag PF is not set, so the processes go to S420. When the line counter LC is not equal to the set line number N, that is, it is not the final print line of the page (S420.NO), the line counter LC is increased one and one line feed of print paper 14 is executed (S430). After that, the processes return to S310. Additionally, when document data does not exist in the present print line, only the ruled line is printed at S380. Moreover, when the document data and the ruled line data do not exist in the present print line (S360.NO), the processes go to S400 without printing the document at S390.

When the line counter LC is equal to the set line number N, that is, print data of the final print line of the page are read out (S420.YES) and the ruled line flag KF is not set, that is the ruled line data does not exist in the present print line (S440.NO), the processes go to S450. The page counter PC is increased one and "1" is set in the line counter LC (S450). And, the print paper 14 of the page just printed is discharged and the following print paper is fed until the first line of the following print paper reaches the print position (S460), and the processes go to S310. When the document and the ruled line are printed in the final print line of the page (S420.YES, S440.YES), the ruled line data printed in the final print line is read out, the ruled line data of the vertical ruled line 22 and the horizontal ruled line 23 which touches this vertical ruled line 22 is searched, and the data indicating the presence of the vertical ruled line 22, the beginning and the end position of the horizontal ruled line 23 are stored in the search ruled line data memory 81 (S470). When only the vertical ruled line 22 is searched (S480.NO, S490.YES), the processes go to S450. However, when the vertical ruled line 22 and the horizontal ruled line 23 which touches this vertical ruled line 22 are printed in the final print line, the process goes to S500. And, the page counter PC is increased one and "1" is set in the line counter LC (S500). The first address in the first line of the page indicated by the page counter PC is stored in the ruled line data pointer KP (S510). And the vertical ruled line data of the first line which starts from the address indicated by the ruled line data pointer KP is searched (S520). When the vertical ruled line 22 is not searched by this search, that is, no vertical ruled line in the table spreads to the next page (S530.NO), the processes go to S460.

If, for example, the number set for lines N is 20 and the number set for characters is 19, when the ruled line data shown in FIG. 6(a) is stored in the ruled line data memory 73, the ruled line is printed in print paper 14 of the first page as shown in FIG. 6(b). FIG. 6(a) shows each ruled line data in the ruled line data memory 73 corresponding to the print position. And, the ruled line data "0,0" memorized in addresses corresponding to the print position where the ruled line is not printed. In FIG. 6(a), the ruled line data "0,0" are abbreviated at addresses where no ruled line data is filled in. Further, the column 0 is for a supplementary memory which memorizes the ruled line data to print the vertical ruled line 22 in the left edge of the first print column of each print line. And, in each line corresponding to the print line, the line 0 is for a supplementary memory which memorizes the ruled line data to print the horizontal ruled line 23 at the top edge of the first print line of each print column.

In the case that the table constituted by this ruled line data ends on the first page and does not spread over the next page, a search is conducted for the ruled line data of the 20th line to determine if the vertical ruled line 22 and the horizontal ruled line 23 which touches this exist in the final print line (the 20th print line) of this page. However, the vertical ruled line data does not exist in the first line corresponding to the first print line of the next page. Therefore, the horizontal ruled line 23 is not printed at the top of the first print line of the next page.

On the other hand, when the table constituted by this ruled line data spreads over the next page, the determination of S530 becomes YES. In this case, the print paper 14 of the page printed at present is discharged and the following print paper if fed until the first line of the following print paper reaches the print position (S540). And then, firstly, the print paper 14b is moved to the opposite direction of the paper feeding by only one print line, and secondly, the horizontal ruled line 23 is printed additionally at the top of the first print line based on the beginning and end position data of the horizontal ruled line 23 in the search ruled line data memory 81, and the print paper 14b is moved in the direction of the paper feeding by only one print line (S550), and the processes go to S310.

Figure 7A:
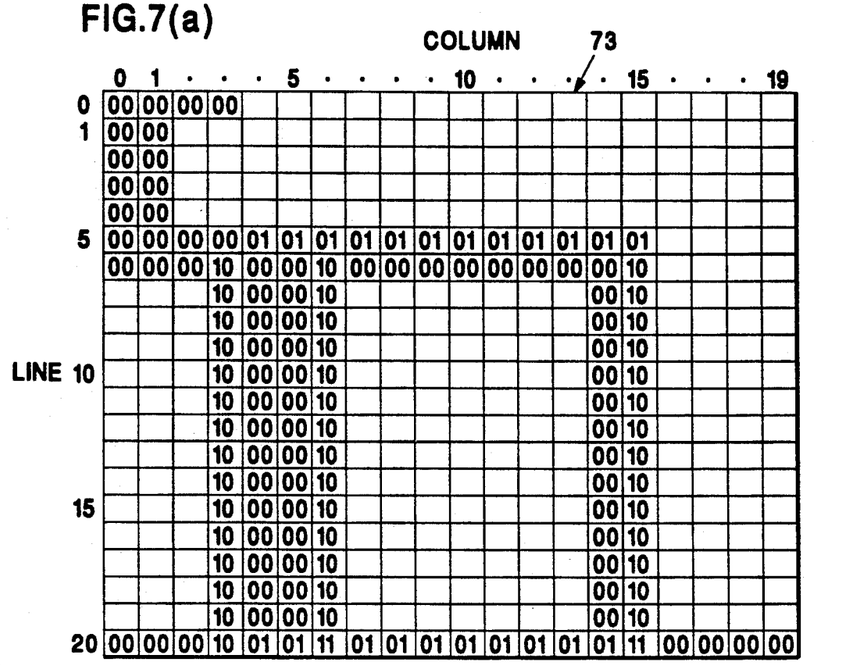
FIG. 7(a) and FIG. 7(b) are diagrams which explain the ruled line data in two pages memorized in the ruled line data memory when the ruled line is printed spread to two pages.
Figure 7B:
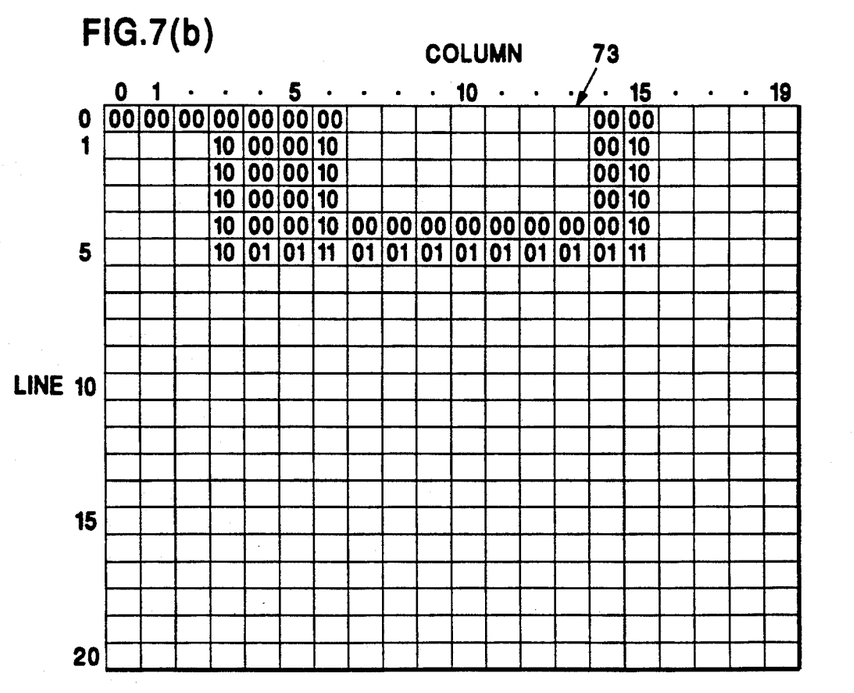
Figure 7C:
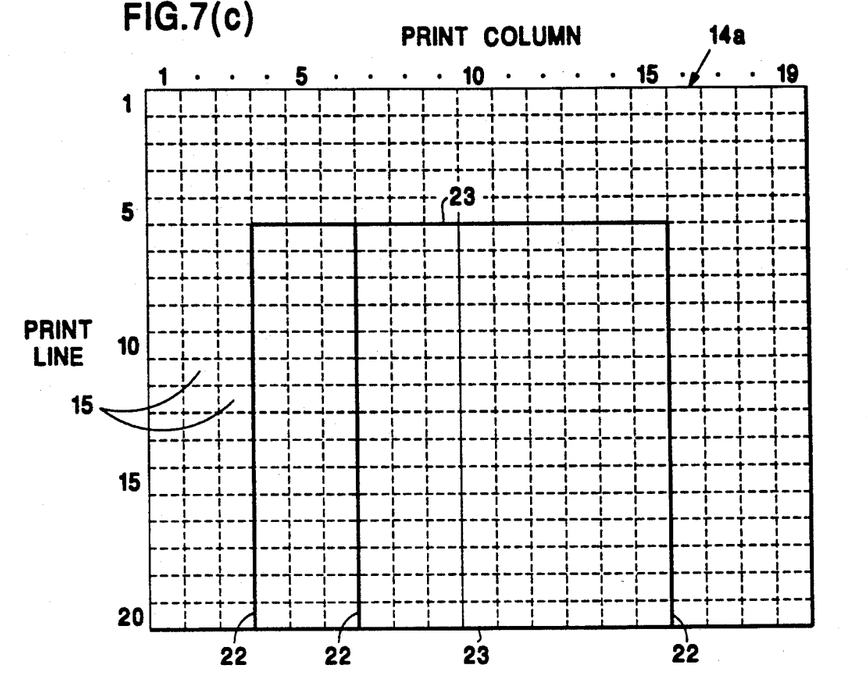
FIG. 7(c) and FIG. 7(d) are diagrams which explain the print result of the ruled line.
Figure 7D:
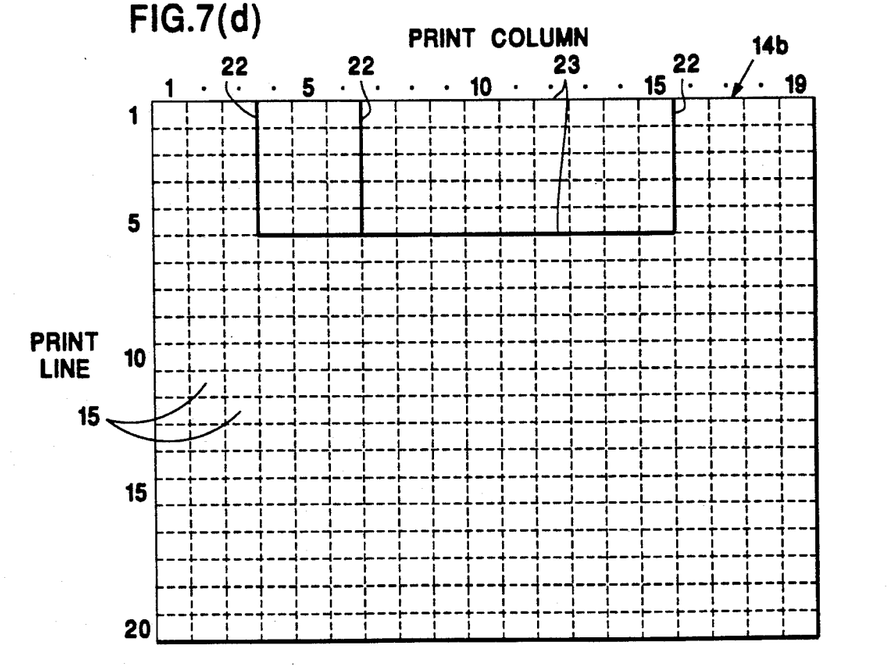

For instance, when the ruled line data to be printed on the first page is stored in the ruled line data memory 73 as shown in FIG. 7(a) and the ruled line data to be printed on the second page is stored in the ruled line data memory 73 as shown in FIG. 7(b), the ruled line of the first page is printed on the first print paper 14a as shown in FIG. 7(c). And, the ruled line of the next page is printed on the following print paper 14b as shown in FIG. 7(d). That is, the horizontal ruled line 23 equal to the horizontal ruled line 23 printed on the final print line of the first page is printed on the top of the first print line of the next page. In addition, when the horizontal ruled line data only exists as a result of a search for the ruled line data of the final print line of the first page (S480.NO, S490.NO), S540 and S550 are similarly executed and the horizontal ruled line is printed on the top of the first print line of the next page.

Figure 5A:
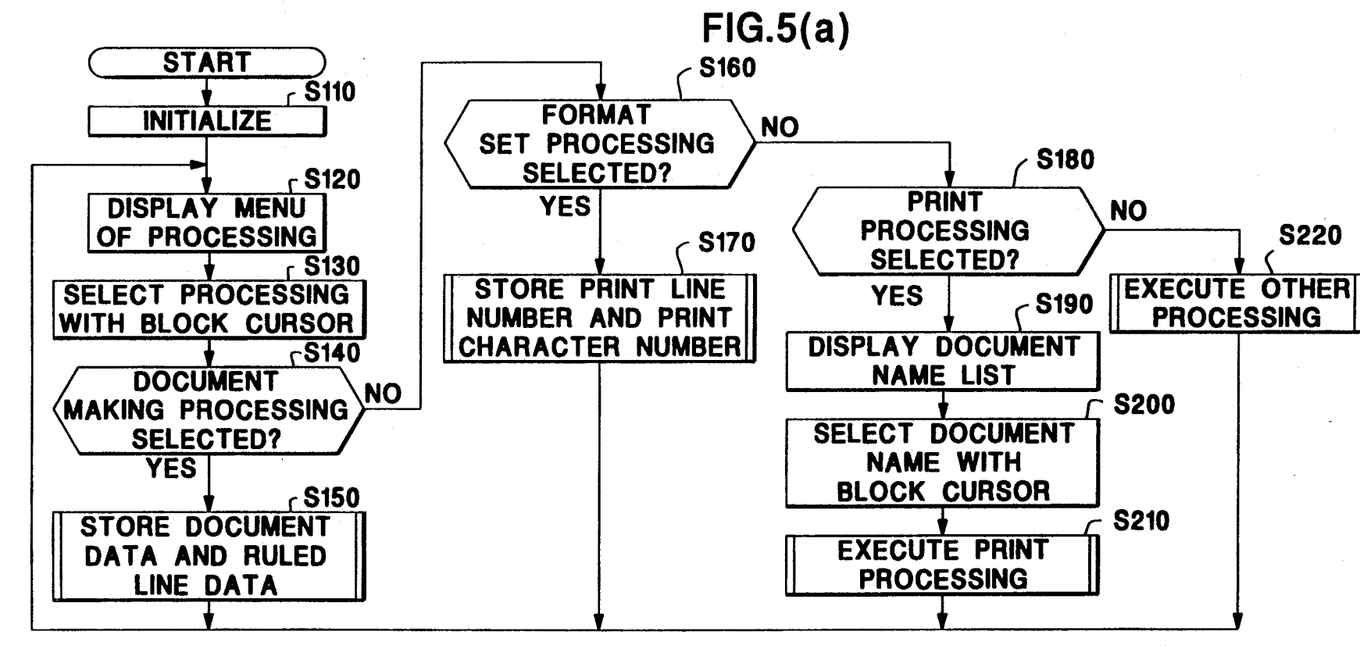

Moreover, when the other processing are selected while executing a main control as shown in FIG. 5(a), selected processing is executed (S220) and the processes return to S120.

As explained above, in the case in which the vertical ruled line 22 in the table and the horizontal ruled line 23 which touches the vertical exist in the final print line of the page under printing, the horizontal ruled line 23 is printed at the top of the first print line of the next page when this table extends to the first print line of the next page. Therefore, the constitution of the table printed on the next page can be completed. Moreover, when this table does not spread to the first print line of the next page, the printing of an unnecessary horizontal ruled line on the first print line of the next page can be prevented.

While this invention has been described with reference to the above-mentioned embodiment which applies the print output to the print mechanism PM, the invention can be applied to print output to a screen, such as the CRT 65, by a similar processing.

Of course, this invention can be applied to various word processors.

What is claimed is:

1. A data processing apparatus comprising:
   an input means for inputting data corresponding to characters, symbols, vertical and horizontal ruled lines, and instructions in a format of successive pages into an input data memory means;
   said input data memory means for storing the input data corresponding to an output position of each page;
   an output means for outputting ruled lines, characters, and symbols on an output medium;
   an output area memory for storing a predetermined output area of each page;
   a line counter for storing data during printing concerning on which line of output medium the ruled lines, characters, and symbols are to be output;
   an output control means for reading the data from the input data memory means, the output control means controlling the output means, wherein the output control means sends a signal to said output means to output characters, symbols, and ruled lines corresponding to the data read from the input data memory on a line of each page determined by the data of the line counter;
   a ruled line data search means for searching for ruled line data corresponding to a vertical ruled line and a horizontal ruled line which is to be output to a final line of a first page,
   said ruled line data search means also for searching for ruled line data corresponding to a vertical ruled line which is to be output to a first line of a second next page, wherein said ruled line data search means searches said output area memory, said line counter, and the input data memory; and
   a horizontal ruled line addition control means for controlling the output control means, wherein the output control means outputs a horizontal ruled line on the first line of the second page which corresponds to the ruled line data of the horizontal ruled line of the final line of the first page when said ruled line data search means finds a horizontal ruled line on the final line of the first page and a vertical ruled line on the first line of the second page.

2. Apparatus as in claim 1, and further comprising determining means for determining said predetermined output area, said predetermined output area determined by a number of lines of a page and a number of characters in a line, wherein said output area memory stores said numbers and characters.

3. Apparatus as in claim 2, wherein said input means includes means for inputting data corresponding to output area and wherein said determining means includes means for receiving output area data from said input means.

4. Apparatus as in claim 2, wherein said output control means includes means for reading one line of data from said input data memory according to the number of characters in a line stored in said output area memory.

5. Apparatus as in claim 2, wherein said output control means includes means for changing the data stored in said line counter each time one line of data is output.

6. Apparatus as in claim 5, wherein said ruled line data search means includes a comparison means for determining whether the data in said line counter and the number of lines stored in said output area memory are equal, and wherein said ruled line data search means searches for the ruled line data when said comparison means determines that the data in said line counter and said number of lines are equal.

7. Apparatus as in claim 2, wherein said determining means includes a line data memory means for storing data representative of the horizontal line output by the output control means when said determining means determines that the data in the input data memory means includes data corresponding to the horizontal line.

8. Apparatus as in claim 7, wherein the said line data memory means stores the data corresponding to the horizontal line as a beginning position and an ending position of the horizontal line.

9. Apparatus as in claim 8, wherein said control means includes means for sending an output signal to the output means, the signal including data corresponding to a horizontal line according to the beginning and ending positions stored in said line data memory means.

10. Apparatus as in claim 2, wherein the memory means includes means for storing an entire line of data.

11. Apparatus as in claim 1, wherein said ruled line data search means includes means for searching the ruled line data, corresponding to the horizontal ruled line which is output by the output control means on the final line of the first page, wherein the ruled line data search means searches for a vertical ruled line which touches the horizontal ruled line.

12. Apparatus as in claim 1, wherein said input data memory stores at least two pages of data.

13. Apparatus as in claim 1, wherein said output means is said output for printing the data on a printing medium.

14. Apparatus as in claim 1, wherein said horizontal ruled line addition control means includes means for controlling the output control means, wherein the output control means outputs a horizontal ruled line above the first line of the second page.

15. Data processing apparatus for outputting successive pages of data, comprising:
    input means for inputting data including data corresponding to characters, substantially horizontal ruled lines and substantially vertical ruled lines;
    memory means for temporarily storing data input from said input means, said data being stored in a format of successive lines and successive pages;
    determining means for determining if the data stored in the memory means includes data corresponding to a substantially horizontal line and a substantially vertical line stored in the same line of the memory means, and for determining if a portion of a line of data from a next successive page includes data corresponding to a substantially vertical line which extends from a first page to the next successive page, wherein said determining means includes a line indicating means for indicating a line for outputting data thereon, an output area memory means for storing a number of lines on one page and a comparison means for determining whether data of said line indicating means and data corresponding to the total number of lines stored in said output area means are equal; and control means for sending an output signal to output data corresponding to a horizontally extending line in the first line of data on said next successive page in response to the determination made by the determining means.

16. Data processing apparatus for outputting successive pages of data comprising:

input means for inputting data including data corresponding to characters, substantially horizontal lines and substantially vertical lines in a format of successive lines and successive pages;

memory means for storing successive portion of lines of data from said input means;

output means for outputting characters, substantially horizontal lines and substantially vertical lines;

determining means for determining whether the data stored in the memory means corresponds to a last line of a page, whether the stored data includes only data representative of a horizontal line, and whether there is an absence of data stored in the memory means which corresponds to a substantially vertical line, wherein said determining means includes a line indicating means for indicating a line for outputting data thereon, an output area memory means for storing a number of lines on one page and a comparison means for determining whether data of said line indicating means and data corresponding to the total number of lines stored in said output area memory means are equal; and control means for sending an output signal to said output means to output data corresponding to a substantially horizontal line in the first line of data on a next successive page, said control means being responsive to the determination made by the determining means.

17. Apparatus as in claim 16, wherein the memory means includes means for storing an entire line of data.

18. Apparatus as in claim 16, further comprising horizontal ruled line addition control means for controlling the control means, wherein the control means sends a signal to output the horizontal ruled line above the first line of the next page.

* * * * *